(No Model.)
C. A. LIEB.
BALL BEARING.
No. 438,320.
4 Sheets—Sheet 1.
Patented Oct. 14, 1890.
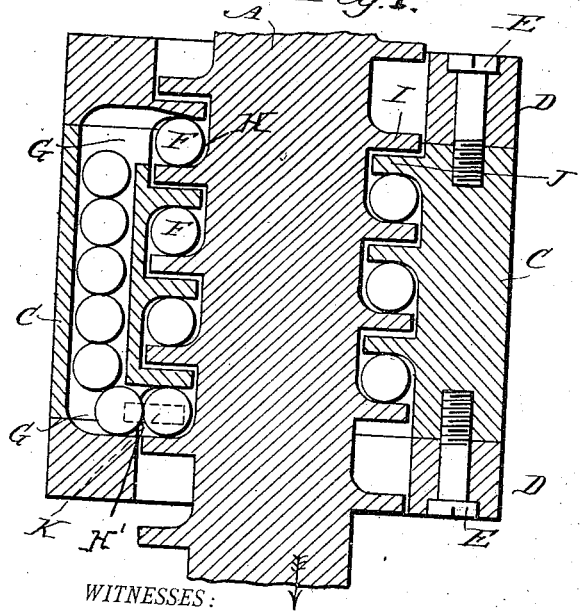
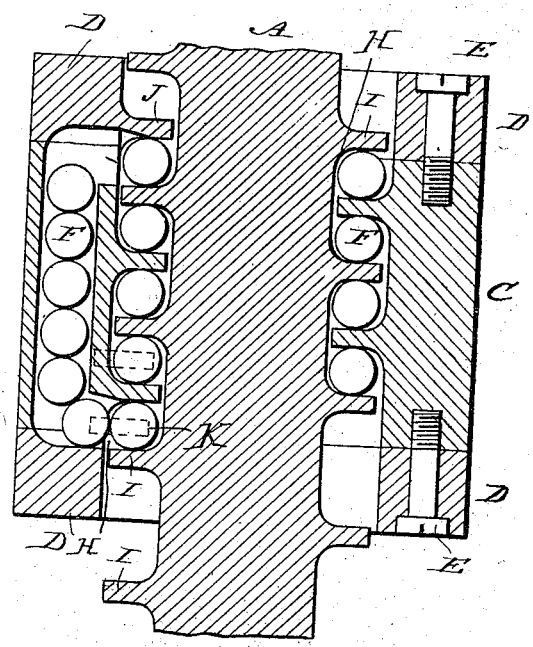
WITNESSES:
D. C. Reusch.
F. C. Smith.
INVENTOR
Charles A. Lieb
BY Phillips Abbott
his ATTORNEY (No Model.) 4 Sheets—Sheet 2.

C. A. LIEB.
BALL BEARING.

No. 438,320. Patented Oct. 14, 1890.

WITNESSES:
D. C. Reusch
F. C. Smith

INVENTOR
Charles A. Lieb
BY Phillips Abbott
his ATTORNEY (No Model.) 4 Sheets—Sheet 3.
C. A. LIEB.
BALL BEARING.
No. 438,320. Patented Oct. 14, 1890.
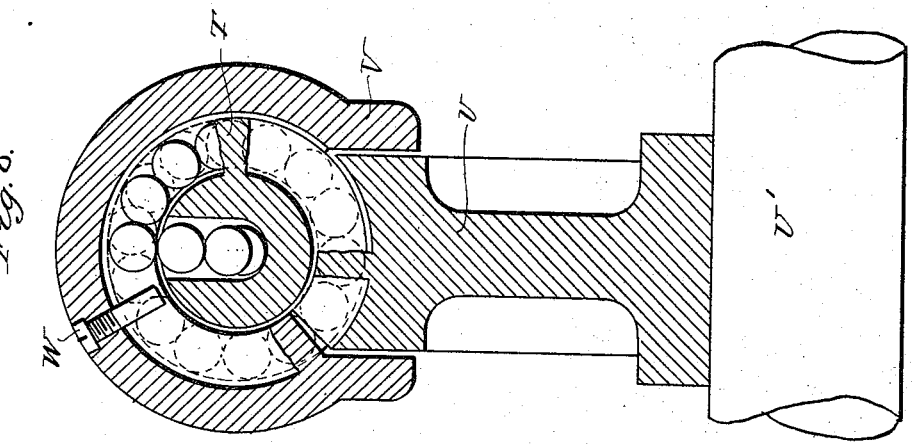
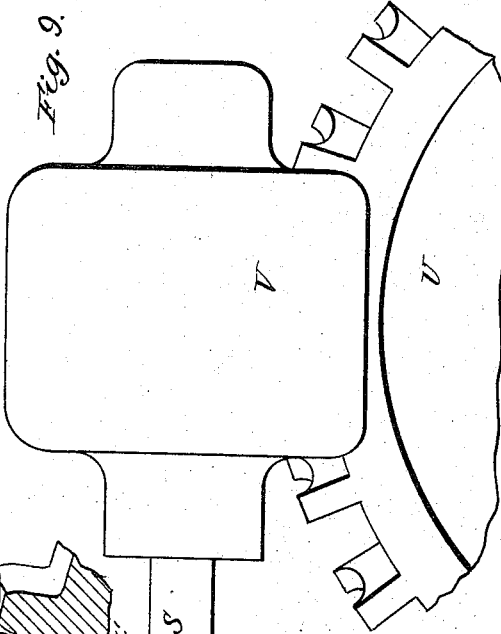
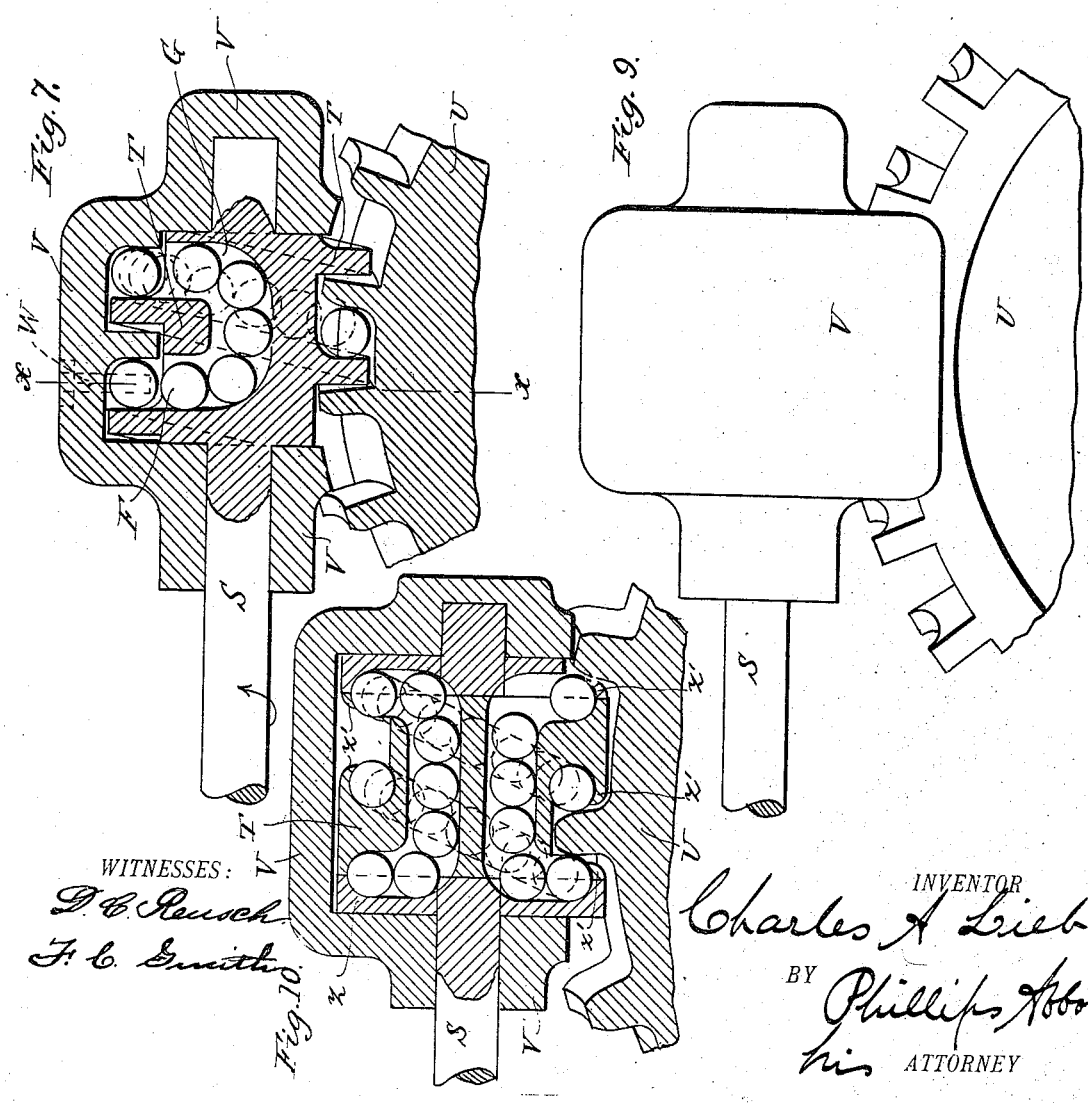
WITNESSES:
INVENTOR
Charles A. Lieb
BY Phillips Abbott
his ATTORNEY (No Model.) 4 Sheets—Sheet 4.
C. A. LIEB.
BALL BEARING.
No. 438,320. Patented Oct. 14, 1890.
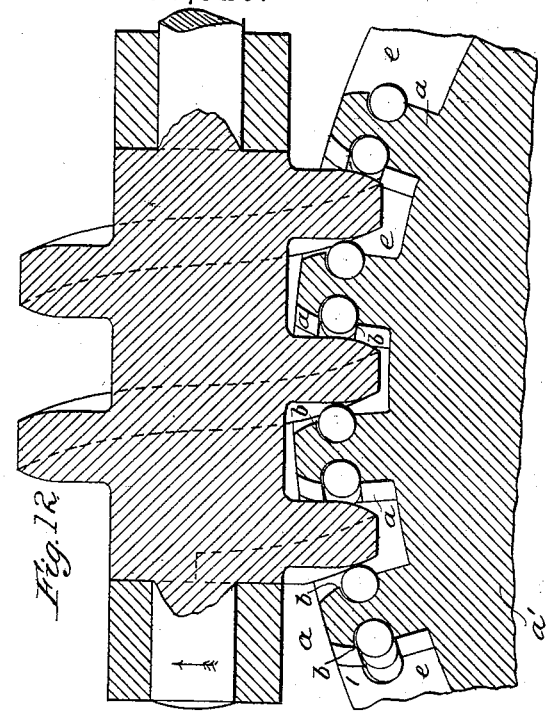
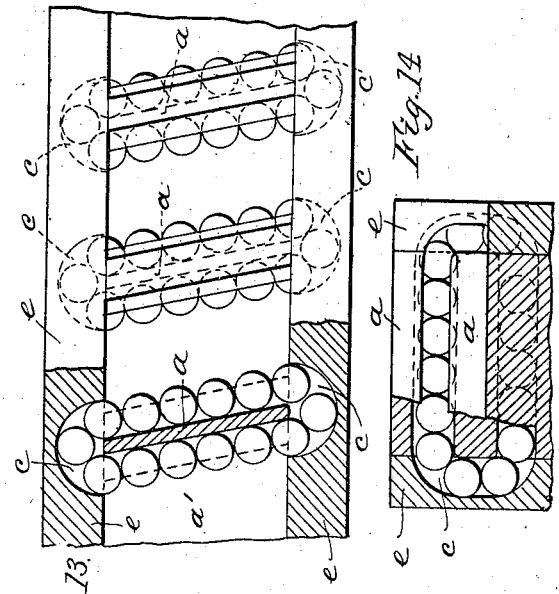
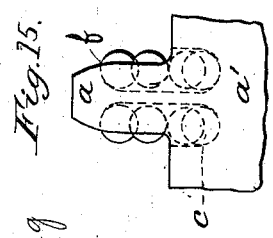
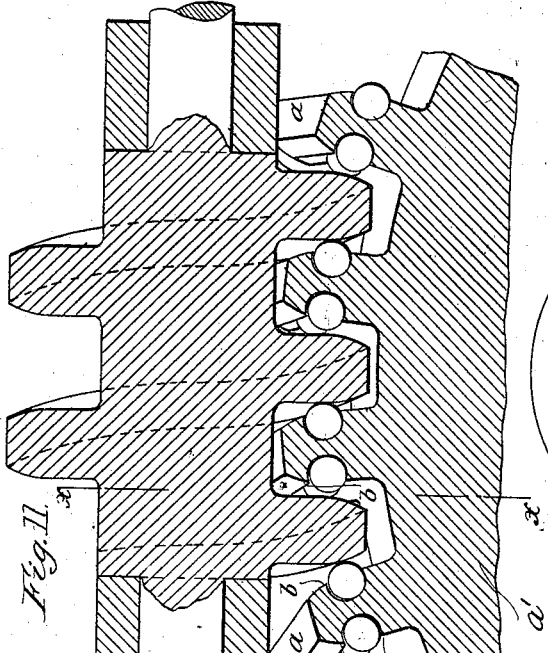
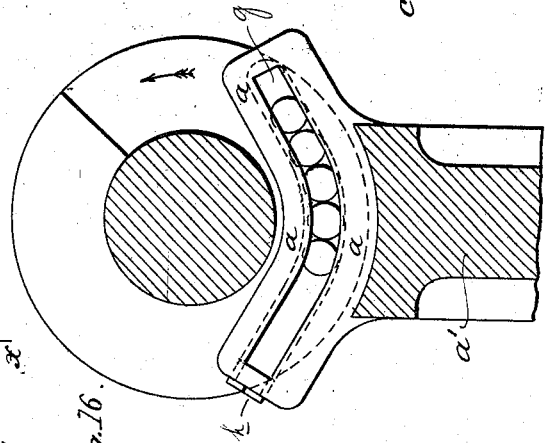
WITNESSES:
D. C. Reusch.
F. C. Smith
INVENTOR:
Charles A. Lieb
BY Phillips Abbott
his ATTORNEY

UNITED STATES PATENT OFFICE.

CHARLES A. LIEB, OF NEW YORK, N. Y.

BALL-BEARING.

SPECIFICATION forming part of Letters Patent No. 438,320, dated October 14, 1890.

Application filed February 17, 1890. Serial No. 340,674. (No model.)

*To all whom it may concern:*

Be it known that I, CHARLES A. LIEB, a citizen of the United States, and a resident of New York, in the county of New York and State of New York, have invented certain new and useful Improvements in Ball-Bearings for Threaded Rods and Sleeves, of which the following is a specification.

My invention relates to improvements in anti-friction bearings between the spiral threads or ribs of screws or worms and the teeth, ribs, or projections of parts which it is desired to move by the relative rotation of the screw and part to be moved about the axis of the former.

A leading feature of my invention is wherein the thread upon the rod and the thread or projection upon the sleeve or other part interlock with one another, so that the pressure of the balls, instead of coming upon the corners or apices of the threads, as heretofore, is received upon a flat face of the threads. Thus wear of the parts is prevented, also injury to the balls, and smoothness and uniformity of action are secured.

Another feature of my invention enables me, when desired, to remove all of the balls from engagement with the thread of the rod, they being received within a chamber made in the sleeve. Thus when all of the balls are within the chamber the rod may be withdrawn from the sleeve without danger of dropping the balls, and in some forms where threads do not interlock, when all the balls are out of the thread on the rod, it may be shoved straight through the sleeve without rotation, if desired; also by certain modifications of my invention I adapt the same to use in connection with a worm and worm-gear.

Figure 3:
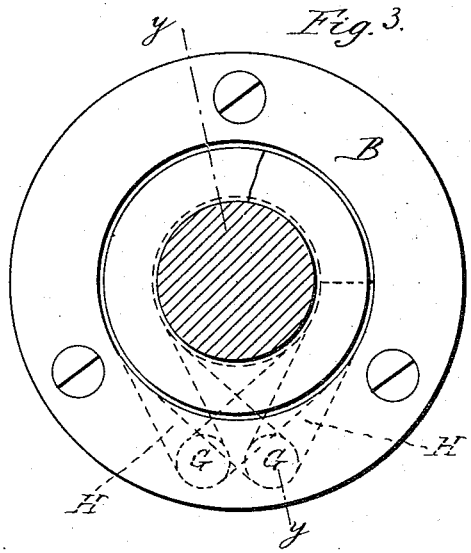
Figure 4:
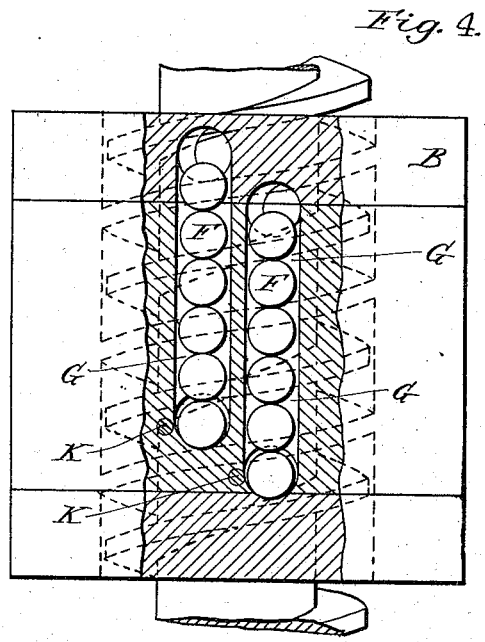
Figure 5:
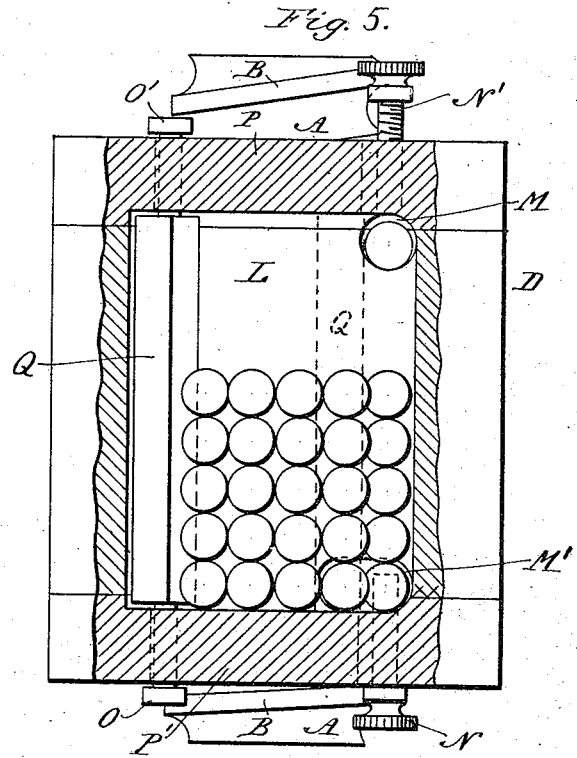
Figure 6:
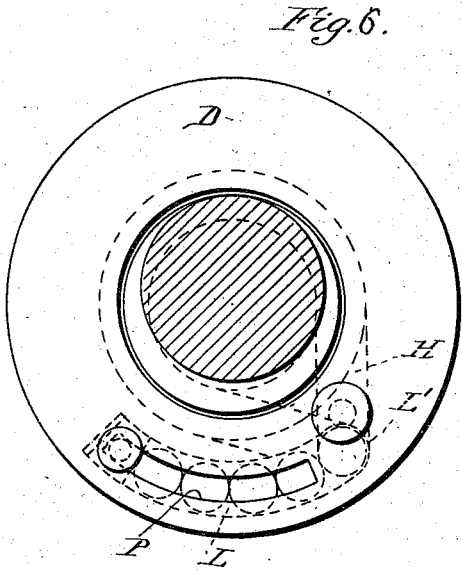

In the drawings, Figure 1 illustrates one form of the interlocking threads on the rod and sleeve, whereby the pressure is taken upon the square surface thereof. Both the sleeve and rod in this instance are shown in section. Fig. 2 shows a view the same in general character as that shown in Fig. 1, in which there are employed double sets of balls operating in what may be called a "double thread." This section is taken on the line $y\ y$ of Fig. 3. Fig. 3 is an end view of the devices shown in Fig. 2. Fig. 4 is an elevation of the devices shown in Figs. 2 and 3, a portion of the sleeve being broken away to disclose the double galleries or passages for the passage of the balls from one end of the sleeve to the other. Fig. 5 is an elevation, the sleeve being partly broken away to show the ball-containing chamber in the sleeve, into which all the balls can be received, when required, showing also parts which coact with the chamber. Fig. 6 is an end view of the devices shown in Fig. 5. Fig. 7 is a view in longitudinal section of my invention as applied to a worm and its gear. Fig. 8 is a section on the line $x\ x$ of Fig. 7. Fig. 9 is a side view of the parts shown in Fig. 7. Fig. 10 illustrates a longitudinal section of a modified form of worm-gear apparatus. Figs. 11 and 12 are longitudinal sections of worms and worm-gears, showing a form of my invention in which the balls are held upon or in the teeth of the worm-gear. Fig. 13 shows a plan, partly in section, of the gear shown in Fig. 12. Fig. 14 shows an elevation, partly in section, of one of the teeth of the gear shown in Figs. 12 and 13. Fig. 15 shows an alternative method of allowing the balls to travel about the teeth of the gear. Fig. 16 shows a modified form of the teeth of the worm, whereby a gallery for the circulation of the balls is rendered unnecessary.

Referring first to Fig. 1, A is the shaft provided with threads I, as usual. C is the sleeve, provided internally with threads J, which interlock with the threads I. It has preferably, but not necessarily, two caps D and D'—one at each end—fastened to the main body of the sleeve by screws E or in any other preferred manner. F are the balls. There are as many of them placed between the threads as may be desired. I prefer that the frictional surface, and also the gallery or reverse passage, hereinafter to be described, shall be nearly filled with them, but not quite, so that there may be a little space to avoid friction. G G is the gallery or passage-way connecting at H H' with the interior or bore of the sleeve, so that the balls may pass from one end of the sleeve to the other through this passage-way, being received again within the thread after they have made their transit.

The operation of the device is apparent. Upon revolving either the sleeve or the rod the pressure comes upon the balls, which revolve continually in a manner well understood. Thus the friction is taken upon a rolling surface, thereby substituting a rolling for a sliding friction. It is obvious that as the rod moves longitudinally the balls partake of the same movement, but go slower than the rod. Thus were it not for the gallery or reverse passage G they would ultimately jam at the end of the sleeve; but by this means they are successively rolled out of the thread in the sleeve and rod into the gallery, thence upwardly and in at the upper end of the gallery through passage H, where they again re-enter the thread, thus forming an endless series or chain and continuing the operation indefinitely. If the rod be moved in the reverse direction from that shown by the arrow, the operation will be directly the reverse.

I place a pin K at the desired point in the thread of the sleeve, whereby the balls are at the proper time intercepted and shunted into the gallery G for transmission to the other end of the sleeve.

In Figs. 2, 3, and 4 I show a construction in which the parts are substantially the same as shown in Fig. 1, and are given the same lettering, excepting that in the construction shown in said Figs. 2, 3, and 4 the threads on the sleeve and on the rod interlock in such manner that there are ball-spaces on each side of them. This of course necessitates dual sets of balls and dual galleries G in the sleeve, because the balls never get from one thread into the other, since they cannot pass through the thread. I therefore show in Figs. 3 and 4 the two galleries G and two intercepting pins K and two sets of balls each in their own thread. Under this construction I secure the advantage that the apparatus may be used in either direction and the anti-friction balls be used in both, whereas in the construction shown in Fig. 1 the anti-friction balls are available only when the apparatus is moved in the direction of the arrow.

In Figs. 5 and 6 I show a construction of the parts in which a chamber is provided in the sleeve into which the balls may pass, if desired, thus entirely removing them from the threads. In this construction L represents a chamber made in the body of the sleeve large enough to receive all of the balls, which enter it at M and M' in the same manner that they enter the gallery in Fig. 1 at H and H'; but in this construction I provide two threaded pins N and N', which, entering through the top of the sleeve, although they may be located in other places, if preferred, may be screwed in and intercept the passage of the balls—that is to say, when desired to gather the balls in the chamber, as shown in Fig. 5, I adjust the pin N' so that it is not within the entrance-passage to this chamber; but I screw the pin N in sufficiently far to intercept the exit-passage. Thus the balls one after the other are crowded into this chamber, from which they are not allowed to escape. They are thus one after the other removed from the thread of the rod and sleeve, until finally they are all gathered in the chamber. The rod can then of course be easily taken out of the sleeve without removing the balls therefrom. When desired to remove them from the chamber into the thread again, I either run back the pin N, opening the exit-passage, and run in the pin N', thus closing the other passage, or if I wish them to go in the opposite direction I leave the pin N' projected, and I then loosen the set-screws O and O', which pass through the end of the caps on the sleeve playing in slots P and P' made in the caps coincident with the chamber L, which screws engage in the ends of a bar Q, placed within the chamber and adapted to move therein. I then apply pressure to the bar through the screws O and O' in any preferred manner. Levers or other mechanism may be employed, if desired, whereby the balls are squeezed out from the chamber into the thread in the rod and sleeve until there is but a single row of balls in the chamber, which of course cannot be expelled. I may then, if desired, slightly retract the bar Q into the position shown in dotted lines, Fig. 5, thus constituting that portion of the chamber L which is between the bar and the end of the chamber marked L' (see Fig. 6) practically the same as the gallery G shown in Fig. 1. Thus the apparatus may be then used as long as desired in the same manner as that shown in Figs. 1 and 2, and when desired I may enlarge the chamber L by retracting the bar Q, thus withdrawing the balls and allowing free and rapid longitudinal movement of the bar or sleeve, as before stated.

The devices illustrated in the foregoing Figs. 1 to 6 are useful in a great variety of mechanical structures when heavy work is done in presses, elevators, jacks, &c.

In Figs. 7, 8, and 9 I show my invention adapted to use in a worm-gear. S is the worm-shaft, T is the worm proper, U is the worm-gear, and U' is the shaft of the worm-gear. V is a casing which surrounds the worm and projects over the worm-gear at that part which engages with the worm. This casing is sufficiently strong to confine the balls in place. A pin W intercepts the balls and deflects them through the gallery G in the same manner the pins do in the construction shown in Figs. 3, 4, 5, and 6. The casing V, as before stated, prevents the ball from escaping. In the construction of the parts just described it is obvious that the worm can be operated, utilizing the balls in one direction only. In order that the balls may be availed of in both directions, I also make a construction shown in section in Fig. 10. In it the teeth of the worm-gear enter between two sets of balls. Thus the worm is constructed somewhat upon the plan of the apparatus shown in section in Fig. 2, the principle there shown being applied to the worm. The galleries through which the balls pass from one end of the worm to the other are shown as formed in the body of the worm, and there are plates Z and Z' screwed to each end of the worm within the casing V, through which the delivery and receiving parts of the gallery are also partly made. The operation of this form of worm will be readily understood from that which has already been said; but I desire to call special attention to one feature illustrated in Fig. 10, which does not appear in any of the other drawings heretofore described, but does appear in Figs. 11, 12, 13, 14, 15, and 16 as applied to the teeth of the gear instead of to the worm, as in Fig. 10, and that is that more than one-half of the ball-space is made in the worm—that is to say, the ball-recess in the worm is made so large that there are overlapping parts Z and Z', (which may be the metal of the worm or a plate or strip of metal attached thereto,) which prevent the balls from dropping out from the ball-recess in the gear and yet allow them free rotation therein—there being a sufficient portion of the balls left projecting beyond the plane of the worm to properly engage with the teeth of the worm-gear.

In Fig. 11 I show a modification of my invention as applied to worm mechanism. In it the balls are applied to the teeth $a$ of the worm-gear $a'$ and upon both sides of the teeth, so that they will be utilized in either rotation of the worm. The balls are held in place by the overlapping of a part of the teeth, as seen at $b$ $b$, and the gallery through which the balls can continue their transit is shown at $c$ in an extended part $d$ of the gear-teeth. The extension occurs at each end of each tooth. In this way, as will be readily understood, the balls continue their movement round and round the tooth in which they are severally placed. When the worm is turned in one direction, they move in that direction, and when it is reversed they travel in the reverse direction; but the number of balls in each tooth is such that there are always balls on each side of the tooth.

In Figs. 12, 13, and 14 I show a construction the same as that shown in Fig. 11, excepting that there are plates $e$ $e$ attached at either side of the gear, in which the galleries are made instead of in an extended part of the teeth, as in Fig. 11.

In Fig. 15 I show a construction of the ball-receiving recesses and transit passage or gallery in which they do not pass round and round the tooth, but through an upper passage $f$ made in the tooth proper, and through which they project for engagement with the worm, and thence through a gallery at or near one end of the tooth, and thence back again through a lower transit-passage parallel with the ball-space in the tooth, and thence again through another gallery at the other end of the tooth connecting with the ball-space in it. Of course if it is desired that there shall be balls on both sides of each tooth these ball passage-ways are made on both sides of it. This is the construction shown in Fig. 15.

In Fig. 16 I show a construction of a worm-gear in which the balls are received within an arc-shaped recess $g$ made in the side (one or both) of each tooth. The teeth are extended laterally beyond their ordinary width, and the number of balls placed in each recess is such that there shall be considerable unoccupied space at either end of the recess $g$, into which the balls may roll during their contact with the worm. It will be noticed that the balls, being acted upon by gravity, will always center at the middle or lower part of the ball-recess, thus being in proper position to receive the worm. I provide a screw-plug $h$ by which I can conveniently introduce the balls into their recesses.

In order to avoid friction between the balls I sometimes make alternate balls of differing materials—for instance, Babbitt metal and steel. Special composition balls may be used and also other metals.

From the foregoing it will be apparent to those who are familiar with this art that my invention is capable of various adaptations, and that the principle of my invention may be employed in connection with many different forms of threaded rods and their sleeves or devices which bear equivalent mechanical relations to each other. It will also be obvious that it is immaterial whether the threaded rod turns upon its axis or the rod remains stationary, and the sleeve, gear-wheel, or other part to be moved is caused to revolve about the rod. In some cases the rod and sleeve might be revolved simultaneously in opposite directions without departing from the spirit of my invention, it being only necessary that the rod and part to be moved be revolved relatively to one another, or, in other words, that they be relatively revoluble about the axis of the rod. I therefore do not limit myself to the details of construction shown, since they obviously may be quite extensively varied.

What I claim is—

1. In combination, a rod having a spirally-disposed rib, a part having a projection entering between the convolutions of said rib, said rod being adapted to rotate relatively to said part, and a series of balls arranged between the rib and the projection, substantially as described.

2. In combination, a rod having a spirally-disposed rib, a part having a projection entering between the convolutions of said rib, said rod and part being adapted to rotate relatively to each other, and a series of balls arranged between the rib and the projection, substantially as described.

3. In combination, a rod having a spirally-disposed rib, a part having a projection entering between the convolutions of said rib, said rod and part being adapted to rotate relatively to each other, and an endless series of balls arranged to travel between the rib and the projection, substantially as described.

4. The combination of a threaded rod, a sleeve having an internal thread corresponding with the thread on the rod, said threads being adapted to interlock with each other, and balls placed between the said interlocking threads, substantially as set forth.

5. The combination of a threaded rod, a sleeve having an internal thread corresponding with the thread on the rod, said threads being adapted to interlock with each other, balls placed between the said interlocking threads, a gallery for the return transit of the balls, and means whereby the balls are deflected into the gallery, substantially as set forth.

6. The combination of a threaded rod, a sleeve having an internal thread corresponding with the thread on the rod, said threads being adapted to interlock with each other in such manner that dual sets of balls may be employed between them, whereby the friction is taken upon the balls when the parts are moved in either direction, dual sets of balls and dual galleries for the return of the balls, and means to deflect the balls into the galleries, substantially as set forth.

7. The combination of the threaded rod, the balls, and the sleeve having a chamber communicating with the ball-space between the rod and sleeve into which all of the balls may be withdrawn, substantially as set forth.

8. The combination, with the threaded rod, the balls, and the sleeve having a chamber into which the balls may be withdrawn, of means, substantially as set forth, whereby the balls may be ejected from the chamber into the ball-space formed by the thread and the recesses, substantially as set forth.

9. The combination, with the threaded rod, the balls, and the sleeve having a chamber into which the balls may be withdrawn, of an adjustable device whereby the balls may be ejected from the said chamber back again into the ball-space between the rod and the sleeve, substantially as set forth.

10. The combination, with the threaded rod, the balls, and the sleeve having a chamber into which the balls may be received, of an adjustable device whereby the area of the chamber may be restricted, substantially as set forth.

Signed at New York, in the county of New York and State of New York, this 11th day of February, A. D. 1890.

CHARLES A. LIEB.

Witnesses:
 PHILLIPS ABBOTT,
 D. S. RITTERBAND.